A. H. HARDY & S. DAVIES.
BEARING BLOCK OR BRASS.
APPLICATION FILED NOV. 11, 1914.
1,146,703.
Patented July 13, 1915.
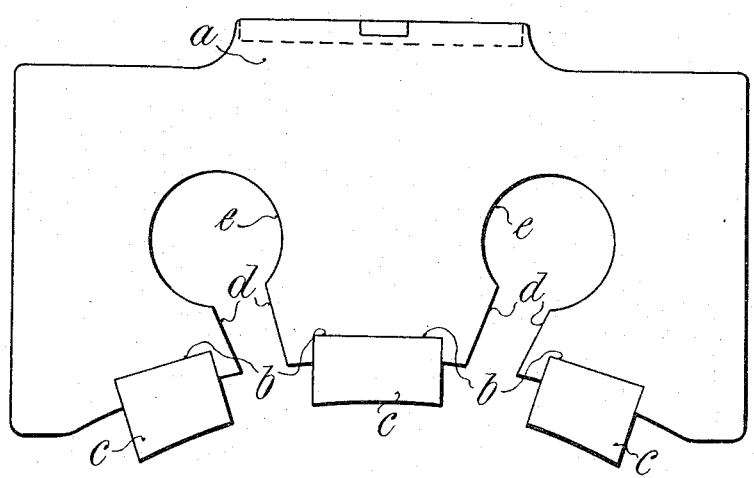
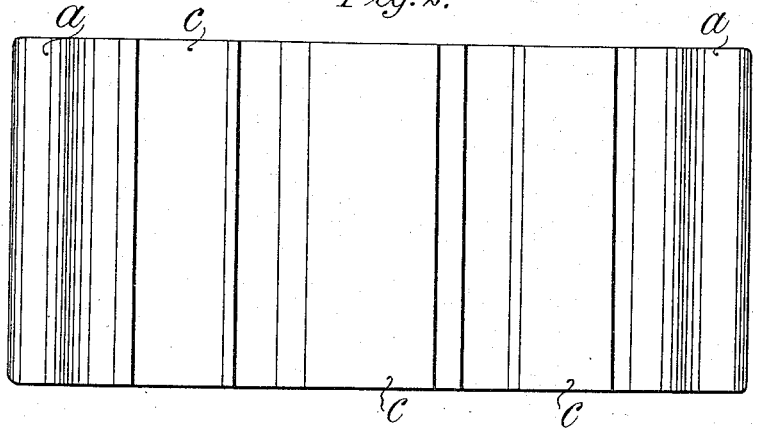
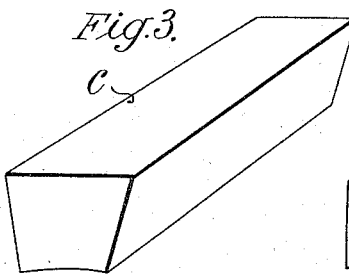
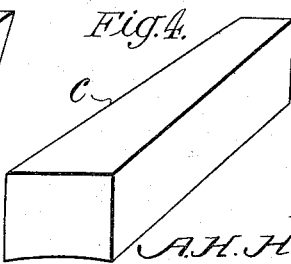
Witnesses
Inventors
A. H. Hardy and
S. Davies
By
Attorney

UNITED STATES PATENT OFFICE.

ALBERT HENRY HARDY AND STEPHEN DAVIES, OF PONTARDAWE, SWANSEA VALLEY, WALES.

BEARING BLOCK OR BRASS.

1,146,703.  Specification of Letters Patent.  Patented July 13, 1915.

Application filed November 11, 1914. Serial No. 871,527.

*To all whom it may concern:*

Be it known that we, ALBERT HENRY HARDY and STEPHEN DAVIES, subjects of his Majesty the King of England, residing at St. Dunstan, Brecon Road, Pontardawe, Swansea Valley, in the county of Glamorgan, South Wales, and Bettws-y-coed, Uplands, Pontardawe, Swansea Valley, in the county of Glamorgan, South Wales, respectively, have invented a certain new and useful Improvement in Bearing Blocks or Brasses, of which the following is a specification.

This invention relates to improvements in bearing blocks and brasses and it refers more particularly to top bearings or riders of the kind intended for use with heavy machinery such as rolling-mills and the like where owing to excessive wear and breakage it is frequently necessary to provide for their renewal.

The present invention has for its object to provide a top bearing or rider of this kind in which the quantity of brass or other like anti-friction metal is reduced; the bearing surface can be quickly renewed; and in which the friction is considerably reduced owing to the construction of the bearing and to the improved facilities thereby afforded for lubrication.

At present it is the common practice to secure the brass or bearing surface proper of such a top bearing in a groove in the underside surface of a block of steel or iron or other cheap metal.

Now according to the present invention we form the bearing surface of a plurality of sections which are secured in separate grooves in the underside surface of the block and in spaced relationship with each other; the block also being formed or shaped to facilitate the lubrication between the separate sections.

In order that the invention may be more clearly understood and more readily carried into effect the same is hereinafter described with reference to the accompanying drawings and the novel features thereof more particularly pointed out in the appended claims.

In these drawings:—Figure 1 is a side elevation of a top bearing block or brass; Fig. 2 is an underside plan view; and Figs. 3 and 4 are detail perspective views of modified forms of sectional bearing strips.

The block proper or body portion $a$ is formed of steel, iron, or any other relatively cheap metal, and is as shown provided with a plurality of longitudinally disposed recesses $b$ on its curved underside portion for the reception of a corresponding number of detachable sections or strips $c$ of gunmetal, brass, or other antifriction metal forming the bearing surface. The sections $c$ may be of substantially rectangular section and be retained in place by being made to fit friction tight in their recesses as shown in Figs. 1 and 2; they may be made of dovetail section as shown in Fig. 3, or be longitudinally tapered as shown in Fig. 4, and in the latter two cases their grooves $b$ in the block $a$ would be correspondingly shaped as will be readily understood. The block $a$ is formed with passages $d$ between the sections $c$ for the passage of lubricating grease and these may be conveniently formed by cutting or otherwise forming gaps in the block between the sections $c$ leading to the lubricant recesses $e$.

It will thus be understood that by the improved arrangement of the bearing brass in sections the lubrication of the bearing is facilitated and at the same time the quantity of brass employed is reduced thus considerably cheapening its production.

The block $a$ is in practice held in place in between the bearing standards of the mill or machine in any known or preferred manner.

What we claim as our invention and desire to secure by Letters Patent of the United States is:—

1. A bearing block comprising a body portion having a plurality of grooves formed therein, sections of anti-friction metal fitted within the said grooves, the said body portion having channels between the said sections, and extending entirely through said block, said block having enlarged openings extending entirely through said block and forming lubricant reservoirs, the inner ends of the said channels communicating with the reservoirs.

2. A bearing block comprising a body portion having a plurality of longitudinal grooves formed therein, sections of antifriction metal fitted within the said grooves, the said body portion having longitudinal channels, and extending entirely through said block, the said channels being between the said sections, said block having enlarged openings extending entirely through said block and forming lubricant reservoirs, the inner ends of the said channels communicating with the said reservoirs.

3. A bearing block comprising a body portion having one curved surface, longitudinal grooves formed in the said surface, anti-friction metal sections fitted within the said grooves, the said body portion having longitudinal channels between the said sections, the said channels extending entirely through the body portion radially to the curved surface, said block having enlarged openings extending entirely through said block and forming lubricant reservoirs, the inner ends of the said channels communicating with the said reservoirs.

4. A bearing block comprising a body portion having a curved bearing surface, the said surface having longitudinal channels therein spaced apart and extending entirely through said block, said block having enlarged openings extending entirely through said block and forming lubricant reservoirs, the inner ends of the said channels communicating with the said reservoirs.

5. A bearing block comprising a body portion having a curved bearing surface, the said surface having longitudinal channels therein spaced apart, and extending entirely through said block, the said channels extending within the body portion radially to the said surface, said block having enlarged openings extending entirely through said block and forming lubricant reservoirs, the inner ends of the said channels communicating with the reservoirs.

In testimony whereof we have signed our names in presence of two subscribing witnesses.

ALBERT HENRY HARDY.
STEPHEN DAVIES.

Witnesses:
C. LUDLOW LIVINGSTON,
P. A. LIVINGSTON.

Copies of this patent may be obtained for five cents each, by addressing the "Commissioner of Patents, Washington, D. C."